(12) United States Patent
Riddering et al.

(10) Patent No.: US 9,818,439 B1
(45) Date of Patent: Nov. 14, 2017

(54) DETERMINING GAMMA OF A READ/WRITE HEAD BASED ON ACTIVE GAIN CONTROL AND TEST SIGNAL AMPLITUDE MEASUREMENTS

(71) Applicant: Seagate Technology LLC, Cupertino, CA (US)

(72) Inventors: Jason Riddering, Prior Lake, MN (US); Huazhou Lou, Eden Prairie, MN (US)

(73) Assignee: SEAGATE TECHNOLOGY LLC, Cupertino, CA (US)

( * ) Notice: Subject to any disclaimer, the term of this patent is extended or adjusted under 35 U.S.C. 154(b) by 0 days.

(21) Appl. No.: 15/073,848

(22) Filed: Mar. 18, 2016

(51) Int. Cl.
*G11B 5/60* (2006.01)
*G11B 5/012* (2006.01)
*G11B 20/10* (2006.01)
G11B 5/00 (2006.01)
G11B 5/48 (2006.01)
G11B 19/04 (2006.01)

(52) U.S. Cl.
CPC .......... *G11B 5/6029* (2013.01); *G11B 5/6011* (2013.01); *G11B 20/10314* (2013.01); *G11B 20/10388* (2013.01); G11B 5/012 (2013.01); G11B 5/4866 (2013.01); G11B 5/6088 (2013.01); G11B 19/046 (2013.01); G11B 2005/0021 (2013.01)

(58) Field of Classification Search
None
See application file for complete search history.

(56) References Cited

U.S. PATENT DOCUMENTS

| 7,310,194 | B1 * | 12/2007 | Schardt | ............ | G11B 5/3133 360/75 |
| 9,001,451 | B1 | 4/2015 | Martin et al. | | |
| 2014/0269819 | A1 | 9/2014 | Kiely et al. | | |

* cited by examiner

*Primary Examiner* — Brian Butcher
(74) *Attorney, Agent, or Firm* — Hollingsworth Davis, LLC

(57) ABSTRACT

A change in servo active gain control values is determined from a beginning of a writing of a test region of a recording medium to an end of the writing of the test region. The servo active gain control values are read from servo marks by a read transducer of a read/write head during the writing. After writing of the test region, the test region is read by the read transducer to determine a change in recorded amplitude from the beginning of the writing to the end of the writing. A gamma value of the read/write head is determined based on the change in servo active gain control values and the change in recorded amplitude.

20 Claims, 5 Drawing Sheets

DETERMINING GAMMA OF A READ/WRITE HEAD BASED ON ACTIVE GAIN CONTROL AND TEST SIGNAL AMPLITUDE MEASUREMENTS

SUMMARY

The present disclosure is directed to determining gamma of a read/write head based on active gain control and test signal amplitude measurements. In one embodiment, a change in servo active gain control values is determined from a beginning of a writing of a test region of a recording medium to an end of the writing of the test region. The servo active gain control values are read from servo marks by a read transducer of a read/write head during the writing. After writing of the test region, the test region is read by the read transducer to determine a change in recorded amplitude from the beginning of the writing to the end of the writing. A gamma value of the read/write head is determined based on the change in servo active gain control values and the change in recorded amplitude. The gamma value is used to estimate differences between a reader motion and a writer motion during a calibration routine.

These and other features and aspects of various embodiments may be understood in view of the following detailed discussion and accompanying drawings.

BRIEF DESCRIPTION OF THE DRAWINGS

The discussion below makes reference to the following figures, wherein the same reference number may be used to identify the similar/same component in multiple figures.

DETAILED DESCRIPTION

Figure 1:
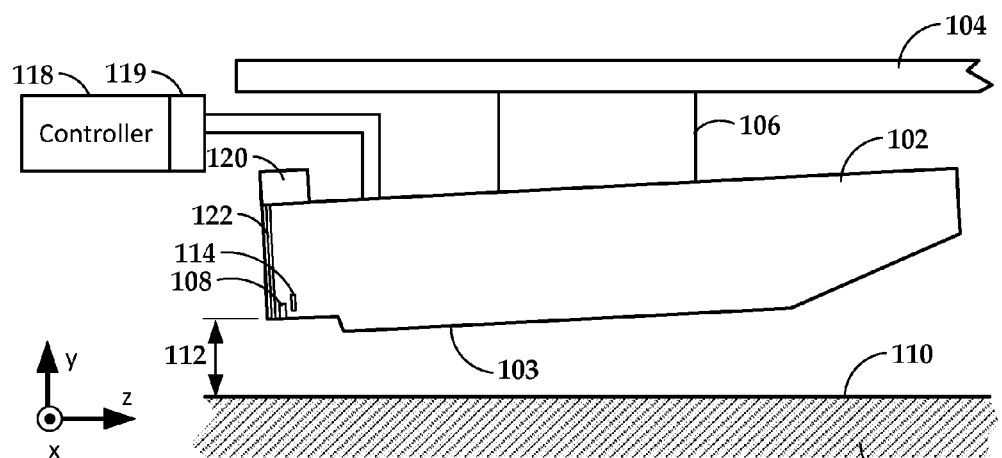
FIG. 1 is a block diagram of a hard disk drive slider and media arrangement according to an example embodiment.

The present disclosure generally relates to data storage devices that utilize magnetic storage media, e.g., disks. In some embodiments below, the devices use heat-assisted magnetic recording (HAMR), also referred to as energy-assisted magnetic recording (EAMR), thermally-assisted magnetic recording (TAMR), and thermally-assisted recording (TAR). This technology uses an energy source such as a laser to create a small hotspot on a magnetic disk during recording. The heat lowers magnetic coercivity at the hotspot, allowing a write transducer to change magnetic orientation, after which the hotspot is allowed to rapidly cool. Due to the relatively high coercivity of the medium after cooling, the data is less susceptible to data errors due to thermally-induced, random fluctuation of magnetic orientation known as the paramagnetic effect.

A laser or other energy source may be directly (e.g., surface-attached) or indirectly (e.g., via optical fiber) coupled to a HAMR read/write head. An optical path (e.g., waveguide) is integrated into the read/write head and delivers the light to a media-facing surface of the read/write head.

Because the size of the desired hotspot (e.g., 50 nm or less) is smaller than half a wavelength of the laser light (e.g., 800-1550 nm), conventional optical focusers (e.g., lenses) are diffraction limited and cannot be used to focus the light to create the hotspot. Instead, a near-field transducer (NFT) is employed to direct energy out of the read/write head. The NFT may also be referred to as a plasmonic transducer, plasmonic antenna, near-field antenna, nano-disk, nano-patch, nano-rod, etc.

Generally, the NFT is formed by depositing a thin-film of material such as gold, silver, copper, etc., near an integrated optics waveguide or some other delivery system. When exposed to laser light that is delivered via the waveguide, the light generates a surface plasmon field on the NFT. The NFT is shaped such that the surface plasmons are directed out of a surface of the write head onto a magnetic recording medium.

Due to the intensity of the laser light and the small size of the NFT, the NFT and surrounding material are subject to a significant rise in temperature during writing. This can affect the clearances between the read/write head and the recording medium, sometimes referred to as fly height or head-to-media spacing (HMS). Generally, localized heating will result in a region surrounding the NFT to protrude even more than the surrounding components while writing. This is sometimes referred to as laser-induced write protrusion (LIWP). This protrusion results in a decrease in clearance between the NFT (and surrounding components) and the recording medium, and is generally not directly measurable in a production drive.

Many read/write heads utilize an embedded heater (e.g., resistive heater) to induce thermal protrusion in order to control HMS. A single heater may be used for both read and write operations, or separate heaters may be used for read and write operations, respectively. The amount of current applied to the heater may be determined based on an open-loop and/or closed loop controller. Because the above-described LIWP contributes affects clearance during writing, control systems need to account for this when switching between read and write modes.

A control system may utilize what is described herein as laser gamma to set write clearances. Laser gamma (also referred to herein as NFT/Writer gamma, or just gamma) is the ratio between change in reader clearance and change in writer clearance as the head comes into thermal equilibrium during the respective operations. Generally, gamma=$\Delta W/\Delta R$, where $\Delta W$ and $\Delta R$ represent the respective change in writer and reader clearance between the start of a write/read operation at ambient temperature and a time during the write/read operations when the head has reached thermal equilibrium. Gamma is used to estimate the delta between reader motion and writer/NFT motion (e.g., reader and writer clearances) during clearance calibration routines. In embodiments described below, methods and apparatuses are described that enable measuring laser gamma. This involves using measurements of active gain control (AGC) of a read preamplifier while writing data together with measurement of test signal amplitude of a test track after the track is written. Generally, a read preamplifier uses an AGC amplifier to adjust gain of the read transducer signal so that peak signal amplitudes fall within a range that facilitates optimal decoding of the data encoded in the signal. All other factors (e.g., state of the read transducer, magnetic flux of the recorded track) being equal, relatively high levels of AGC while reading back data generally indicates relatively high clearance. Similarly, the amplitude of a test track will be higher if the written at a lower clearance, all other factors (e.g., state of the read transducer, read clearance) being equal. As such, these values can be used to estimate both reader and writer clearances/clearance changes, and thereby estimate laser gamma.

In reference now to FIG. 1, a block diagram shows a side view of a read/write head 102 according to an example embodiment. The read/write head 102 may be used in a magnetic data storage device, e.g., HAMR hard disk drive. The read/write head 102 may also be referred to as a slider, write head, read head, recording head, etc. The read/write head 102 is coupled to an arm 104 by way of a suspension 106, e.g., a gimbal. The read/write head 102 includes read/write transducers 108 at a trailing edge that are held proximate to a surface 110 of a magnetic recording medium 111, e.g., a magnetic disk. When the read/write head 102 is located over surface 110 of recording medium 111, a flying height 112 is maintained between the read/write head 102 and the surface 110 by a downward force of arm 104. This downward force is counterbalanced by an air cushion that exists between the surface 110 and an air bearing surface (ABS) 103 (also referred to herein as a "media-facing surface") of the read/write head 102 when the recording medium 111 is rotating.

In order to provide control of the clearance between the read/write transducers 108 and the recording medium 111, one or more heaters 114 are formed in the read/write head 102. A current applied to the heater 114 induces a local protrusion which varies the clearance. The amount of current applied to the heater 114 may vary based on which of the read/write transducers 108 are in use, and may also be adjusted to account for irregularities in the media surface 110, changes in ambient temperature, location of the read/write head 102 over the medium 111, etc. Thermal sensors (not shown) may also be included in the read/write head 102 to facilitate measuring clearances, e.g., by measuring a thermal profile as a function of heater power.

A controller 118 is coupled to the read/write transducers 108, as well as other components of the read/write head 102, such as heaters 114, sensors, etc. The controller 118 may be part of general- or special-purpose logic circuitry that controls the functions of a storage device that includes at least the read/write head 102 and recording medium 111. The controller 118 may include or be coupled to a read/write channel 119 that include circuits such as preamplifiers, buffers, filters, digital-to-analog converters, analog-to-digital converters, decoders, encoders, etc., that facilitate electrically coupling the logic of the controller 118 to the signals used by the read/write head 102 and other components.

The illustrated read/write head 102 can be optionally configured as a HAMR device, and so includes additional components that form a hot spot on the recording medium 111 near the read/write transducer 108. These components include a laser 120 (or other energy source) and a waveguide 122. The waveguide 122 delivers light from the laser 120 to components near the read/write transducers 108. These components are shown in greater detail in FIG. 2, which is a block diagram illustrating a cross-sectional view of the read/write head 102 near the read/write transducers 108 according to an example embodiment.

A read transducer 108a is located downtrack from a write transducer 108b. The read transducer 108a may be configured as a magnetoresistive stack (e.g., giant magnetoresistive, tunnel magnetoresistive, etc.) surrounded by magnetic shields. The write transducer 108b includes a coil 200 that, when energized, induces magnetic flux through a write pole 202 and return poles 204, 206. The aforementioned waveguide 122 delivers light to an NFT 202 located near the write pole 202.

Figure 2:
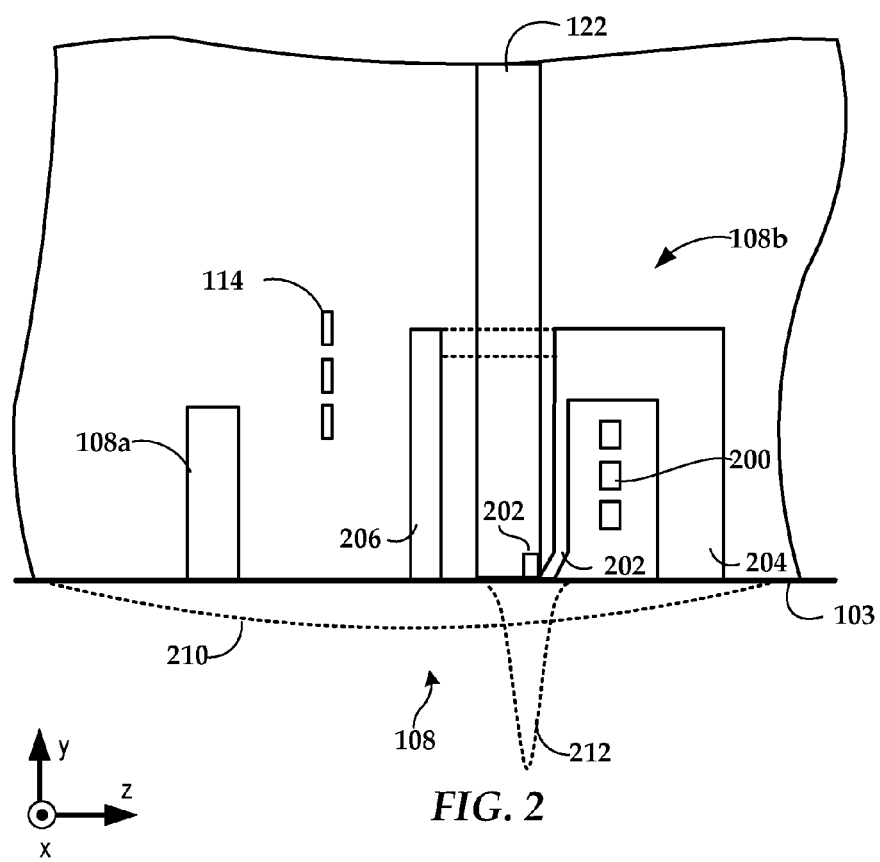
FIG. 2 is a cross-sectional view of a read/write head according to an example embodiment.

The diagram of FIG. 2 shows protrusion near the read/write transducer 108 at the media-facing surface 103. During reads and writes, the heater 114 is activated to control protrusion of the read transducer 108a and write transducer 108b, as generally indicated by broad protrusion shape 210. The write pole 202 and other components of the magnetic writer may also heat significantly while writing, and so contribute to the broad protrusion 210 during write operations. The broad protrusion shape 210 is not necessarily to scale, other than to indicate that it is occupies a fairly broad region near the read/write transducer 108. In contrast, the optical components such as NFT 202 and waveguide 122 cause a narrower protrusion 212. The narrow protrusion 212 covers a smaller region than the broad protrusion 210. This narrow protrusion 212 may also extend further away from the media-facing surface 103 than the broad protrusion 210.

Another distinguishing feature of the narrow protrusion 212 is the time constant, e.g., the relative amount of time it takes to maintain a stable shape after application of heat via the energy source. The narrow protrusion 212 can have a thermal expansion time constant on the order of $1/10$ to $1/100$ of an equivalent time constant the broad protrusion 210. Therefore the narrow protrusion 212 can react significantly faster to input from the energy source compared to the broad protrusion's response to activation of the heater 116.

Figure 3:
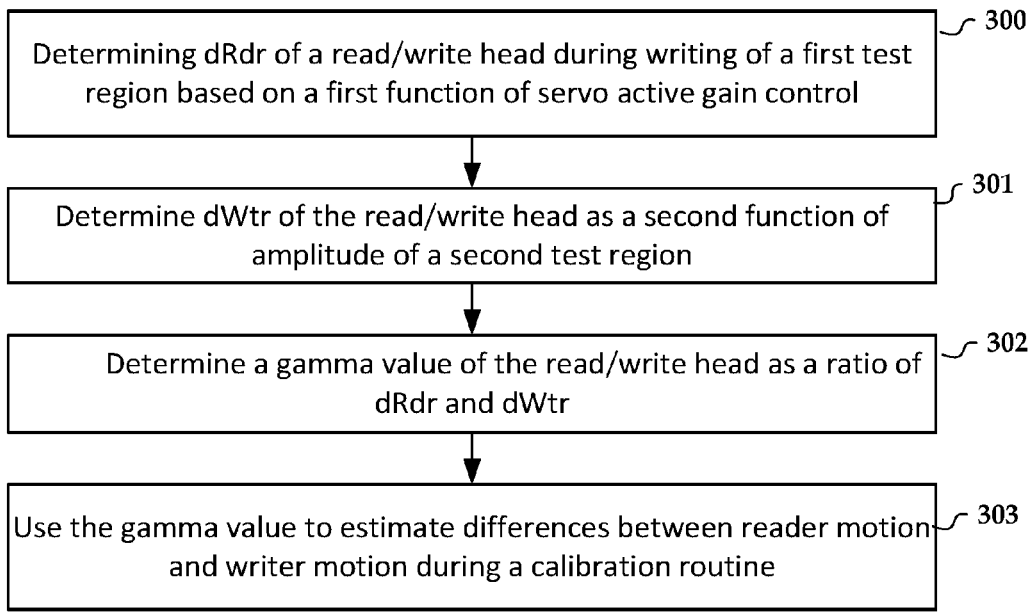
FIG. 3 is a flowchart of a method according to an example embodiment

Reader protrusion can be measured directly by the read transducer 108a. For example, a signal level of pre-written servo data (e.g., via AGC levels used when reading servo marks) can be used to measure clearance of the read transducer. However, writer protrusion is not measured directly because the write transducer 108b does not have a read sensor or similar sensing capability. As a consequence, a fixed predetermined value for the reader and writer protrusion ratio (e.g., gamma) may be used to determine writer heater power. A method to find this gamma value for a HAMR read/write head is shown in the flowchart of FIG. 3.

The method involves determining 300 a change in a reader clearance (dRdr) of a read/write head during writing of a first test region based on a first function of servo active gain control. A change in a writer clearance (dWtr) of the read/write head is determined 301 during writing of a second test region as a second function of amplitude of the second test region. The amplitude is read after the second region is written. A gamma value of the read/write head is determined 302 as a ratio of dRdr and dWtr. The gamma value is used 303 to estimate the delta between reader motion and writer/NFT motion during clearance calibration routines, e.g., during drive factory calibration. The clearance calibration routines use Wallace spacing equations (e.g., harmonic ratio) to measure the reader motion, so servo AGC-based reader spacing calibration is not needed once gamma is determined. During normal drive operation in the field (e.g., when the drive is in-use), clearance coefficients are used to set read and write clearances. These clearance coefficients can be derived using the gamma.

Figure 4:
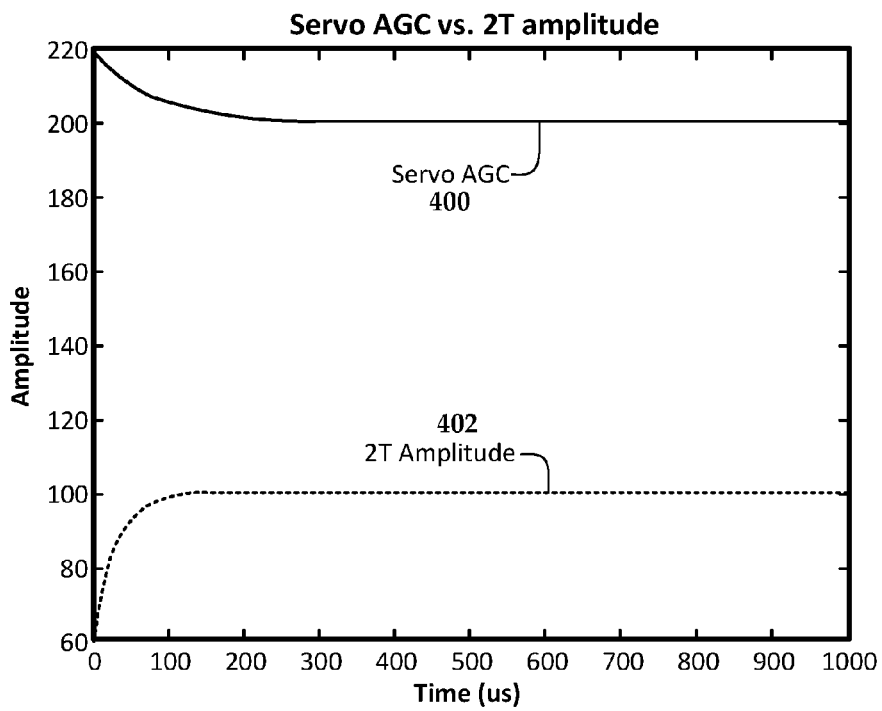
FIGS. 4, 5, 6, and 7 are graphs showing measurement of clearance data according to example embodiments.

In FIG. 4, a graph shows obtaining of reader and writer clearances according to an example embodiment. Curve 400 shows the determination of reader clearance during writing as a function of AGC. Curve 400 is obtained by writing a of test data, e.g. a 2T signal, to a region of the recording medium, e.g., a track. It will be understood that, while the descriptions below describe using a 2T test signal written to a track for testing, different signals (e.g., 3T, 4T) and different regions (e.g., fractional tracks, multiple tracks) may be used alternatively or in addition.

At time <0 shown in FIG. 4, the writer heater is set to the calibrated write heat for this head, track, write current, and laser current combination. Further, at time <0, the writer coil is off, and the laser is set to a bias current less than the laser threshold current, above which lasing will occur. At time=0, the writer heater remains constant, the writer is turned on to the optimized write triplet, and the laser current is set to the optimized laser current for this head, track, and write triplet combination. Writing of the test data commences at t≥0 with these settings. In this way, the protrusion dynamics are due only to the writer and laser turning on and reaching the target clearance.

The region of the recording medium generally includes user data sectors interleaved with servo sectors. The servo sectors include pre-written data used by the servo control system for positioning the read/write heads. The writer is turned off (e.g., by turning off the laser and/or write coil) when traversing servo sectors so as not to erase the servo data. When traversing the servo sectors, the reader is turned on to obtain the necessary data (e.g., position signals) used in positioning the read/write head over the tracks. The servo data is processed by a preamplifier, which, among other things, applies gain to the signal via the AGC before the signal is processed by a decoder. The ACG value is automatically adjusted so that its output is in a desired amplitude range that is optimal for decoding of the data.

As indicated by curve 400, the servo AGC is returned wedge-by-wedge during the writing of the test data. As expected, the AGC value decreases over time as the write transducer components of the read/write head (e.g., optical path and write coil) come into thermal equilibrium and fully heat the nearby regions of the read/write head, which includes the read transducer. This moves the read transducer closer to the recording medium, reducing the value of ACG needed to decode servo data. As such, curve 400 represents reader spacing change during writing due to heat from the write coil and optics.

Curve 402 represents the amplitude read from a 2T test region, which may be the same region written to obtain curve 400 or a different region. After the 2T data has been written, it is traversed again by the reader and the amplitude of the 2T signal is measured. This produces curve 402, in which the amplitude of the 2T signal is read. In this case, time=0 case corresponds to beginning of the first sector of data written during the sequence. As expected, this results in a low value of amplitude during the start of the write. This is due to the write pole and NFT being farther from the recording medium until the write transducer components of the read/write head come into thermal equilibrium and induce subsequent additional protrusion. This curve 402 represents the writer spacing change during writing due to heat from the write coil and optics. It should be noted that the curve 402 could be obtained directly by examining a signal level received at the preamplifier from the reader, or derived from AGC gain of the reader while reading the user data.

The results in FIG. 4 are in units of AGC or amplitude, which in this case are digital values provided from an analog-to-digital converter (ADC). They are representative of clearance values, and may be converted to actual clearance distance values through additional testing or known response characteristics. For example, techniques that utilize the Wallace spacing loss equation can estimate read clearance distances by examining multiple harmonics of a test signal and comparing the levels of the different harmonics.

In other examples, a sensor (e.g., thermal sensor, acoustic emission sensor) can be used to estimate clearance distance based on thermal profiles and/or contact detection. These techniques can be used to map 2T amplitudes and AGC values described above to units of distance (e.g., Å).

Figure 5:
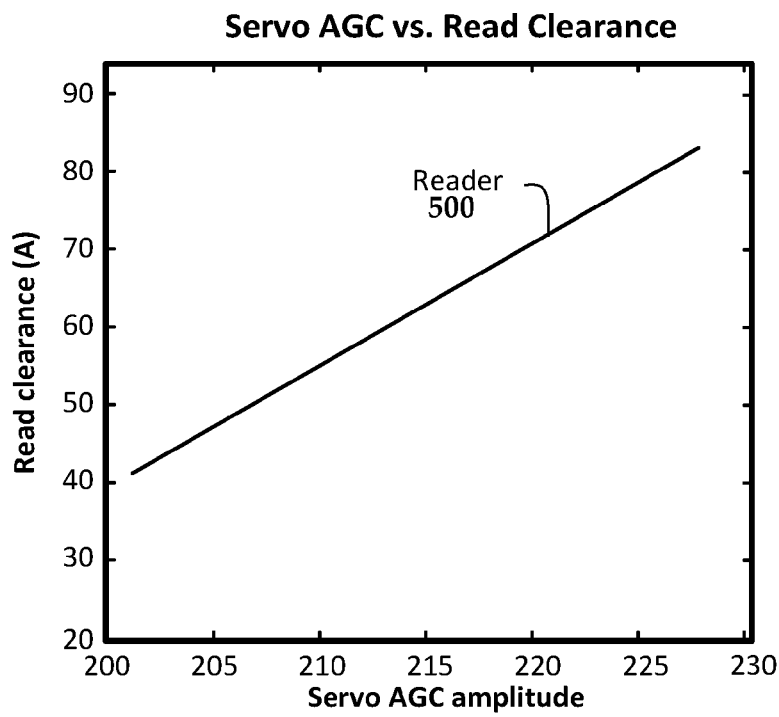
Figure 6:
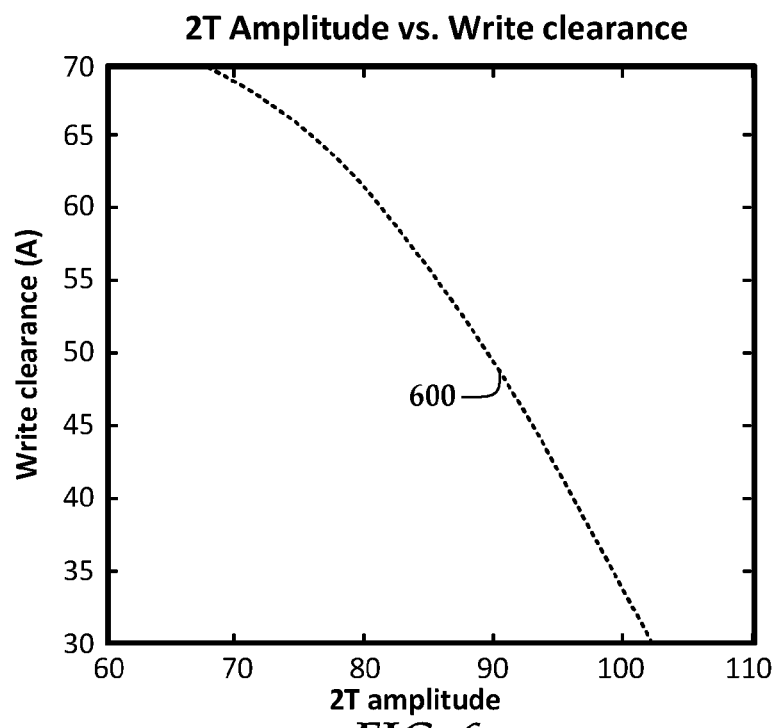

In FIGS. 5 and 6, graphs show clearance data obtained from separate servo AGC and 2T measurements according to an example embodiment. In FIG. 5, a plot shows a spacing calibration for servo AGC. To obtain curve 500, read clearance is set to a particular target value (e.g., by inputting a particular current to a reader heater/actuator) while reading servo marks during a track read. Note that read clearance setting is mostly independent of the laser and writer, and so read clearance as a function of read clearance actuator power can be reliably obtained. Average AGC (horizontal axis) is measured during a read over multiple read clearance targets (vertical axis). Curve 500 represents a curve fit of these measurements.

In FIG. 6, a curve 600 represents a fit of and 2T amplitudes (horizontal axis) measured after writing to a test region has completed at different target clearances (vertical axis). The calculated 2T-amplitude-based clearance represents the writer/NFT clearance during the write. Note that since the laser gamma is required to set write clearance accurately, this measurement process may need to be iterative, starting with an initial guess for laser gamma, and repeated until convergence. Generally, the graphs in FIGS. 5 and 6 can be used to translate between AGC or 2T amplitude versus time and clearance distance versus time.

Figure 7:
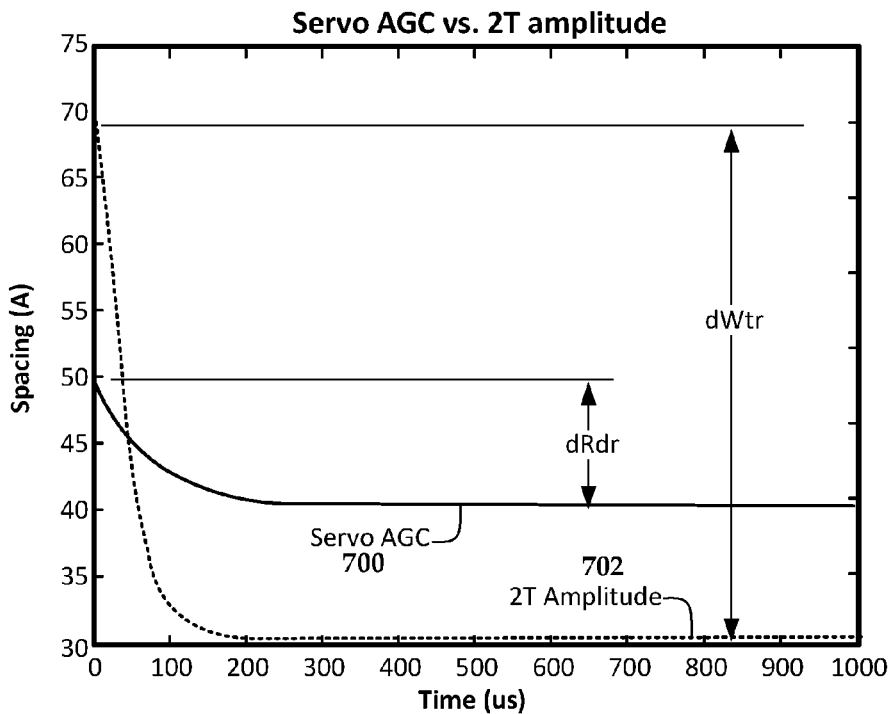

In FIG. 7, a plot shows how this data can be used to determine Writer/NFT gamma. In FIG. 7, a graph shows a change in reader clearance (curve 700) with change in writer clearance (curve 702) when writing a test region according to an example. As indicated in the graph, the change in reader clearance curve 700 from beginning to end of the test pattern region is dRdr and based on the AGC curve 400 combined with reader clearance versus servo AGC curve 502. The change in writer clearance curve 702 from beginning to end of the test pattern region is dWtr and is based on the 2T amplitude curve 402 combined with 2T amplitude vs write clearance curve 600. The ratio of the two delta clearances is the Writer/NFT gamma, e.g, Writer/NFT gamma=dWtr/dRdr. In the illustrated example, dRdr=reader start −reader end=50−40=10 A, and dWtr=writer start−writer end=70−30=40 A. As a result, Writer/NFT gamma=dWtr/dRdr=40/10=4.

After this gamma value is determined, it can be used in operation of a hard disk device. For example, when writing user data, a read clearance $C_R$ can be determined based on servo AGC. This can be used to estimate a writer clearance $C_W$ by using the relation $C_W$=gamma*$C_R$. This estimate can be used to control the write clearance, e.g., used to select a signal level to actuate a write heater or other clearance actuator to the desired clearance.

Figure 8:
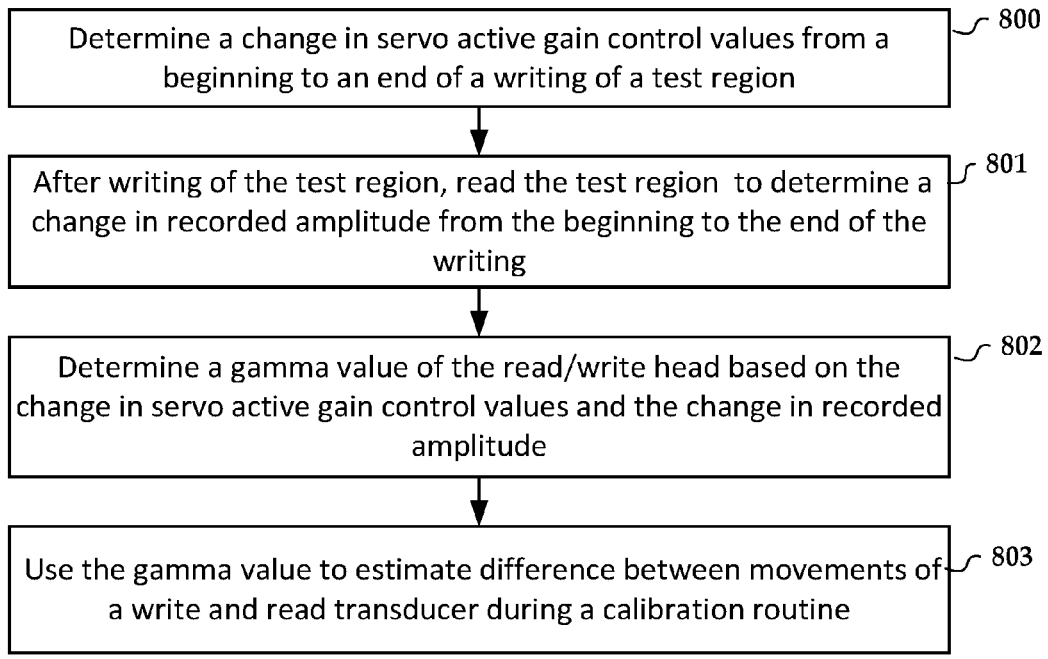
FIG. 8 is a flowchart of a method according to an example embodiment.

In FIG. 8, a flowchart illustrates a method according to another example embodiment. The method involves determining 800 a change in servo active gain control values from a beginning of a writing of a test region of a recording medium to an end of the writing of the test region. The servo active gain control values are read from servo marks by a read transducer of a read/write head during the writing. After writing of the test region, the test region is read 801 by the read transducer to determine a change in recorded amplitude from the beginning to the end of the writing. The change in recorded amplitude may be due to thermal expansion of write components such as write coil, write pole, and laser.

A gamma value of the read/write head is determined 802 based on the change in servo active gain control values and the change in recorded amplitude. For example, a change in the clearance of the read transducer (dRdr) from the beginning to the end of the writing may be determined based on the change in servo active gain control values, and a change in the clearance of the write transducer (dWtr) from the beginning to the end of the writing may be determined based on the change in the recorded amplitude. In such a case, the gamma value is based on a ratio of dRdr and dWtr.

The gamma value is used 803 to estimate differences between a reader motion and a writer motion during a calibration routine. For example, a reader clearance during a calibration routing may be determined based on measurement of the servo active gain control during the user data writing operation. In other cases, reader clearance may be measured during the calibration routing based on Wallace loss equation measurements. In either event, the write clearance may be set based on the read clearance times the gamma value.

Figure 9:
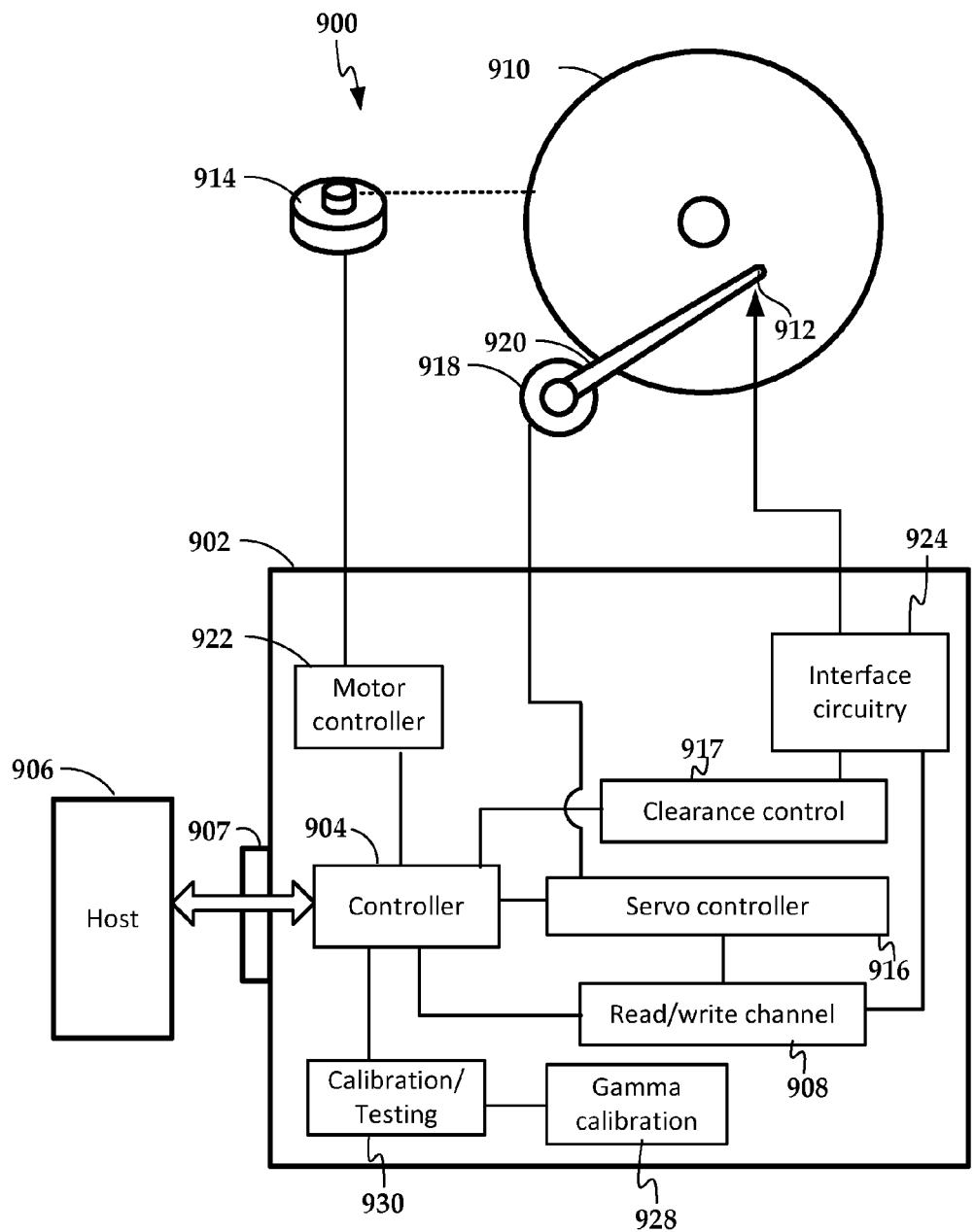
FIG. 9 is a block diagram of an apparatus and system according to an example embodiment.

In reference now to FIG. 9, a block diagram illustrates components of system 900 according to an example embodiment. The system 900 includes a HAMR hard drive apparatus 902 having one or more read/write heads 912. The apparatus 902 includes a system controller 904 that controls a number of functions of the system 900, such as communications between the apparatus 902 and a host device 906 via a host interface 907. The host device 906 may include any electronic device that can be communicatively coupled to communicate with the apparatus 902, e.g., a general-purpose computer, a factory test apparatus, remote terminal, etc.

The system controller 904 may include any combination of custom logic circuits, application specific integrated circuits (ASICs), general-purpose central processing unit (CPU), interface circuits, etc., and may utilize instructions stored as firmware and/or software. The system controller 904 may process instructions to read data from and write data to a recording medium (e.g., disk 910) via a read/write channel 908. The system controller 904 may, among other things, determine a location on the disk 910 for the desired data, move the heads to the location (track) of the data, read or write the data via the read/write channel 908, correct errors, transfer the data to/from the host 906, etc.

The read/write channel 908 converts data between the digital signals processed by the data controller 904 and the analog signals conducted through read/write heads 912. The read/write channel 908 also provides servo data read from the disk 910 to a servo controller 916. The servo controller 916 uses these signals to drive an actuator 918 (e.g., voice coil motor) that rotates an arm 920, upon which the read/write heads 912 are mounted. The heads 912 are moved radially across different tracks of the disk(s) 910 by the actuator motor 918 (e.g., voice coil motor), while a spindle motor 914 rotates the disk(s) 910. A microactuator (not shown) may also be included to provide finer tracking control, and also receives inputs from the servo controller 916. The controller 904 controls the spindle motor 914 by way of a motor controller 922.

During write operations, the read/write channel 908 provides analog signals that are delivered to the read/write heads 912 by way of interface circuitry 924. The interface circuitry 924 include hardware components (preamplifiers, filters, analog-to-digital converters, digital-to-analog converters) that conditions the signals sent to and received from the read/write heads 912. In the illustrated embodiment, the interface circuitry 924 also includes laser control circuitry that energizes a laser (or other energy source) at each of the read/write heads 912 during write operations. The laser control circuitry conditions the signals to ensure the lasers provide sufficient energy to heat a spot on the disk 910 as it is being recorded. Other signals sent to or received from the read/write head 912 may also be conditioned via the preamplifier, such as heater control signals, sensor signals, etc. For example, a clearance control module 917 may read sensor data from the read/write heads 912 (e.g., SAGC, thermal sensor data) to determine current clearance, and modify a signal applied to a heater of the read/write heads 912 to adjust the clearance accordingly.

A gamma calibration module 928 may perform data collection and testing as described above as part of a calibration/testing functionality 930. For example, the gamma calibration module 928 may cause test data to be written to various regions of the disk 910. During the writing, servo ACG may be read to determine a change in reader clearance. After the writing of the same test data or different test data, the test data may be traversed by the reader and signal amplitude measured and recorded. Based on these tests, writer/NFT gamma can be determined and used by the apparatus 902, e.g., by calibration/testing module 930 during factory calibration and qualification testing. The gamma may also be used derive clearance coefficients using the gamma, the clearance coefficients used to set read and write clearances during in-use drive operation. These clearance coefficients can be stored in persistent memory for use by firmware of the apparatus 902 during normal drive field operation.

The various embodiments described above may be implemented using circuitry and/or software modules that interact to provide particular results. One of skill in the computing arts can readily implement such described functionality, either at a modular level or as a whole, using knowledge generally known in the art. For example, the flowcharts illustrated herein may be used to create computer-readable instructions/code for execution by a processor. Such instructions may be stored on a non-transitory computer-readable medium and transferred to the processor for execution as is known in the art.

Unless otherwise indicated, all numbers expressing feature sizes, amounts, and physical properties used in the specification and claims are to be understood as being modified in all instances by the term "about." Accordingly, unless indicated to the contrary, the numerical parameters set forth in the foregoing specification and attached claims are approximations that can vary depending upon the desired properties sought to be obtained by those skilled in the art utilizing the teachings disclosed herein. The use of numerical ranges by endpoints includes all numbers within that range (e.g. 1 to 5 includes 1, 1.5, 2, 2.75, 3, 3.80, 4, and 5) and any range within that range.

The foregoing description of the example embodiments has been presented for the purposes of illustration and description. It is not intended to be exhaustive or to limit the embodiments to the precise form disclosed. Many modifications and variations are possible in light of the above teaching. Any or all features of the disclosed embodiments can be applied individually or in any combination are not meant to be limiting, but purely illustrative. It is intended that the scope of the invention be limited not with this detailed description, but rather determined by the claims appended hereto.

What is claimed is:

1. A method, comprising:
   determining a change in a reader clearance (dRdr) of a recording head during writing of a first test region based on a first function of servo active gain control;
   determining a change in a writer clearance (dWtr) of the recording head during writing of a second test region as a second function of amplitude of the second test region, the amplitude being read after the second region is written;
   determining a gamma value of the recording head as a ratio of dRdr and dWtr; and
   using the gamma value to estimate differences between a reader motion and a writer motion during a calibration routine.

2. The method of claim 1, wherein the first and second test regions are the same region.

3. The method of claim 2, wherein the same region comprises at least part of a track.

4. The method of claim 1, wherein writing the second test region comprises writing a 2T signal.

5. The method of claim 1, further comprising determining, for a plurality of target clearances, a reader clearance distance as a third function of the servo active gain control, wherein determining dRdr comprises applying values of the servo active gain control to the third function.

6. The method of claim 1, further comprising determining, for a plurality of target clearances, writer clearance distance as a fourth function of the amplitude, wherein determining dWtr comprises applying values of the amplitude to the fourth function.

7. The method of claim 1, wherein the recording head comprises a heat-assisted magnetic recording head, and wherein the dWtr comprises a change due to heat generated by a write coil and optical components of the recording head.

8. The method of claim 1, further comprising deriving clearance coefficients using the gamma, the clearance coefficients used to set read and write clearances during in-use drive operations.

9. An apparatus comprising:
   interface circuitry configured to send and receive signals to a recording head that reads from and writes to a magnetic recording medium; and
   a controller coupled to the interface circuitry and configured to:
      determine a change in a reader clearance (dRdr) of the recording head during writing of a first test region to the magnetic recording medium based on a first function of servo active gain control;
      determine a change in a writer clearance (dWtr) of the recording head during writing of a second test region to the magnetic recording medium as a second function of amplitude of the second test region, the amplitude being read after the second region is written;
      determine a gamma value of the recording head as a ratio of dRdr and dWtr; and
      use the gamma value to estimate differences between a reader motion and a writer motion during a calibration routine.

10. The apparatus of claim 9, wherein the first and second test regions are the same region.

11. The apparatus of claim 10, wherein the same region comprises at least part of a track.

12. The apparatus of claim 9, wherein writing the second test region comprises writing a 2T signal.

13. The apparatus of claim 9, wherein the controller is further configured to determine, for a plurality of target clearances, a reader clearance distance as a third function of the servo active gain control, wherein determining dRdr comprises applying values of the servo active gain control to the third function.

14. The apparatus of claim 9, wherein the controller is further configured to determine, writer clearance distance as a fourth function of the amplitude, wherein determining dWtr comprises applying values of the amplitude to the fourth function.

15. The apparatus of claim 9, wherein the recording head comprises a heat-assisted magnetic recording head, and wherein the dWtr comprises a change due to heat generated by a write coil and optical components of the recording head.

16. The apparatus of claim 9, wherein the controller is further configured to derive clearance coefficients using the gamma, the clearance coefficients used to set read and write clearances during in-use drive operations.

17. A method comprising:
   determining a change in servo active gain control values from a beginning of a writing of a test region of a recording medium to an end of the writing of the test region, the servo active gain control values being read from servo marks by a read transducer of a recording head during the writing;
   after writing of the test region, reading the test region by the read transducer to determine a change in recorded amplitude from the beginning to the end of the writing;
   determining a gamma value of the recording head based on the change in servo active gain control values and the change in recorded amplitude; and
   using the gamma value to estimate differences between a reader motion and a writer motion during a calibration routine.

18. The method of claim 17, further comprising:
   determining a change in a clearance of the read transducer (dRdr) from the beginning to the end of the writing based on the change in servo active gain control values;
   determining a change in a clearance of a write transducer (dWtr) of the recording head from the beginning to the end of the writing based on the change in the recorded amplitude; and
   wherein the gamma value is based on a ratio of dRdr and dWtr.

19. The method of claim 17, wherein a writer of the recording head comprises optical components that are heated via a laser, thermal expansion of the optical components contributing to the gamma value.

20. The method of claim 17, wherein writing of the test region comprises writing a 2T signal to the test region.

* * * * *